United States Patent
Miga, Jr.

(10) Patent No.: US 7,810,651 B2
(45) Date of Patent: Oct. 12, 2010

(54) WATER BOTTLE WITH FILTRATION FEATURE

(75) Inventor: Charles W. Miga, Jr., East Greenwich, RI (US)

(73) Assignee: MEDport, LLC, Providence, RI (US)

( * ) Notice: Subject to any disclaimer, the term of this patent is extended or adjusted under 35 U.S.C. 154(b) by 421 days.

(21) Appl. No.: 11/953,428

(22) Filed: Dec. 10, 2007

(65) Prior Publication Data

US 2009/0145839 A1 Jun. 11, 2009

(51) Int. Cl.
| | |
|---|---|
| B01D 27/00 | (2006.01) |
| B01D 35/00 | (2006.01) |
| B01D 35/28 | (2006.01) |
| B01D 24/38 | (2006.01) |
| B01D 29/88 | (2006.01) |
| B01D 35/02 | (2006.01) |
| B67D 7/76 | (2010.01) |
| B01D 24/00 | (2006.01) |

(52) U.S. Cl. .................. 210/466; 210/469; 210/464; 210/470; 210/266; 210/282; 210/455; 210/450; 222/189.06; 222/189.07

(58) Field of Classification Search .............. 210/466, 210/469, 464

See application file for complete search history.

(56) References Cited

U.S. PATENT DOCUMENTS

| | | | |
|---|---|---|---|
| 2,389,185 | A | 2/1945 | Dick |
| 2,781,312 | A | 2/1957 | Klumb et al. |
| 2,998,902 | A | 9/1961 | Thomas et al. |
| 3,327,859 | A | 6/1967 | Pall |
| 3,335,917 | A | 8/1967 | Knight |
| 3,441,179 | A * | 4/1969 | Ragan ........................ 222/129 |
| 4,749,484 | A | 6/1988 | Greenhut |
| 4,814,078 | A | 3/1989 | Stern et al. |
| 5,167,819 | A | 12/1992 | Iana et al. |
| 5,249,712 | A * | 10/1993 | Lontrade et al. ........ 222/189.08 |
| 5,268,093 | A | 12/1993 | Hembree et al. |
| 5,308,482 | A | 5/1994 | Mead |
| 5,518,613 | A | 5/1996 | Koczur et al. |
| 5,545,315 | A | 8/1996 | Lonneman |
| 5,609,759 | A | 3/1997 | Nohren, Jr. et al. |
| 5,681,463 | A * | 10/1997 | Shimizu et al. ............. 210/266 |
| 5,840,185 | A | 11/1998 | Hughes et al. |
| 5,914,045 | A | 6/1999 | Palmer et al. |
| 5,928,512 | A | 7/1999 | Hatch et al. |
| 6,004,460 | A | 12/1999 | Palmer et al. |

(Continued)

OTHER PUBLICATIONS

Innova Pure Water, Inc., website printout dated Jun. 27, 2007.

*Primary Examiner*—Krishnan S Menon
*Assistant Examiner*—Benjamin Kurtz
(74) *Attorney, Agent, or Firm*—Cook Alex Ltd.

(57) ABSTRACT

A flexible water bottle is provided that includes an approach for filtering unfiltered water within the bottle. The bottle includes a filter assembly located within the cap of the bottle such that the filter assembly need not descend into the bottle cavity when the cap is screwed on, thereby not displacing water while screwing on the cap. The filter assembly has an axial flow orientation. An illustrated filter assembly includes paper filters covering the upper and lower ends and can include an activated charcoal filter in between the paper filters. Water is filtered when pressure generated by squeezing the bottle forces water from the bottle cavity through the filter along an axial flow path and out through a spout.

20 Claims, 7 Drawing Sheets

U.S. PATENT DOCUMENTS

| | | |
|---|---|---|
| 6,136,188 A | 10/2000 | Rajan et al. |
| 6,136,189 A | 10/2000 | Smith et al. |
| 6,165,362 A | 12/2000 | Nohren, Jr. et al. |
| 6,193,886 B1 | 2/2001 | Nohren, Jr. |
| 6,478,956 B2 * | 11/2002 | Kaura .................. 210/232 |
| 6,565,743 B1 | 5/2003 | Poirier et al. |
| 6,569,329 B1 | 5/2003 | Nohren, Jr. |
| 6,811,036 B1 | 11/2004 | Vaiano et al. |

* cited by examiner

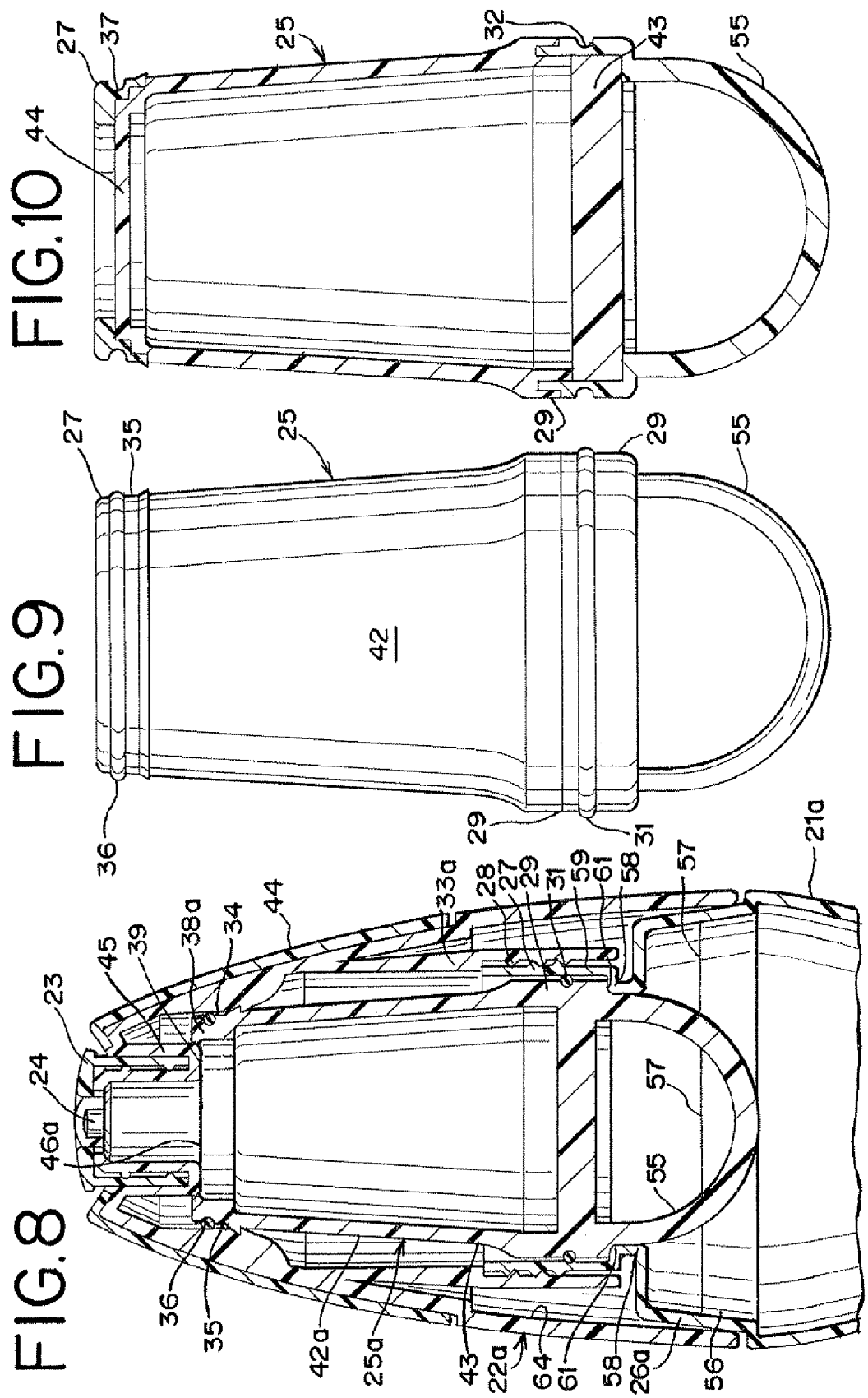

WATER BOTTLE WITH FILTRATION FEATURE

BACKGROUND OF THE INVENTION

1. Field of the Invention

The present invention generally relates to water containers and more particularly pertains to sports water bottles with a cap. The invention relates more particularly to sports bottles having a built-in filtering system for filtering water that flows through the filtering system and out of it at a location at or closely spaced from the outflow location of the bottle.

2. Description of the Prior Art

The use of filters with water containers is known in the prior art. More specifically, water containers with filter assemblies heretofore devised and utilized are known to exhibit a myriad of structural configurations. Known prior art water containers with filters that provide for flow of water through the filtering means include U.S. Pat. No. 2,781,312 to Klumb et al.; U.S. Pat. No. 6,136,188 to Rajan et al.; U.S. Pat. No. 5,167,819 to Iana et al.; U.S. Pat. No. 5,045,195 to Spangrud et al.; and U.S. Pat. No. 5,840,185 to Hughes. However, this set of prior art teaches that all the respective filters descend down into the cavity of the bottle. The present invention has recognized that such structures have an undesirable effect; namely, when the bottle is inverted, which is often the case when athletes drink from sports bottles, and once the water level is below the opening of the filter, water will no longer flow, and a certain quantity of water will remain in the bottle. Also, by placing the filter or filters in the cavity of the bottle, the amount of water the bottle could otherwise hold is reduced by the volume the filter protrudes into the bottle.

Known prior art water containers with filters that provide for radial flow of water through the filtering device include U.S. Pat. No. 3,335,917 to Knight; U.S. Pat. No. 5,545,315 to Lonneman; U.S. Pat. No. 5,914,045 to Palmer et al.; and U.S. Pat. No. 6,193,886 to Nohren. In practicing prior art of this type, the filters descend into the cavity of the bottle, again reducing the amount of water the bottle could otherwise contain. Also, a radial flow approach can create flow difficulties and structural and assembly issues.

U.S. Pat. No. 2,389,185 to Dick and U.S. Pat. No. 6,565,743 to Poirier et al. have filters as part of the cap assembly that do not descend into the cavity. However, these patents disclose the use of disc-shaped filters that are considered by the present disclosure to be inferior to the axial flow, inside-the-cap removable filter unit of the present disclosure.

U.S. Pat. No. 4,681,463 to Shimizu et al. discloses a filter assembly that does not descend into the cavity of the bottle. This filter assembly cannot be separated from the rest of the cap, thereby not allowing for the user of such bottle to replace the filter assembly. Furthermore, the Shimizu filter assembly requires a section of the filter assembly having hollow fibers.

While these devices propose respective objectives and requirements, the aforementioned patents do not disclose a sports water bottle and bottle cap with an integral filtration system that is readily replaceable. The present apparatus includes a filter assembly located within the cap of the bottle such that the filter assembly does not descend into the bottle cavity when the cap is screwed on thereby not displacing water while screwing on the cap. One of the filter assemblies illustrated herein includes a paper filter covering the upper open end and a foam filter covering the lower open end. The filter assembly typically also includes an activated charcoal filter in between the paper filter and the foam filter. Water is filtered when pressure generated by squeezing the bottle forces water from the bottle cavity through the filter and out through the nozzle.

In these respects, the sports water bottles and bottle caps with replaceable integral filtration systems according to the present invention substantially depart from the conventional concepts and designs of the prior art, and in doing so provides an apparatus primarily developed for the purpose of filtering unfiltered water within a sports water bottle.

SUMMARY OF THE INVENTION

The general purpose of the present invention, which will be described subsequently in greater detail, is to provide a sports water bottle and water bottle cap with built-in filter that has advantages over the water containers mentioned heretofore.

The present water bottles generally take the form of flexibly resilient containers commonly known as sports bottles. A filtration system is integrated within the cap, and the filtration system is comprised of a removable and replaceable cartridge with filter layers through which the water flows in succession and along an axial flow path from the cavity of the bottle through the spout of the bottle when typical digital pressure is applied to the exterior of the body of the bottle. The filtration system and the cap are designed so that the filtration system is completely contained within the cap. The result is that when the cap is secured to the bottle, neither the filter nor the cap displaces water within the bottle when the cap and filter are assembled onto the completed bottle after same is refilled.

An aspect, embodiment or object of the present invention is to provide a filtration system that is easily removable and replaceable as a component of the bottle, including the outside surface and design of the bottle.

In another aspect, embodiment or object of the invention, the filtration system has retainers on both ends that secure the filter media to the open ends of the filter cartridge. The lower retainer has a curved handle that is perpendicular to a plane formed by the circumference of the retainer.

Other aspects, embodiments, objects, and advantages of the present invention, including the various features used in various combinations disclosed herein will be understood from the following description according to the preferred embodiments of the present invention, taken in conjunction with the drawings in which specific features are shown.

BRIEF DESCRIPTION OF THE DRAWINGS

FIG. 8 is a cross-sectional view of an alternate embodiment of a filter bottle assembly;

FIG. 9 is an elevational view of a replacement filter assembly usable in the water bottles;

FIG. 10 is a longitudinal cross-sectional view through the central axis of FIG. 9;

DESCRIPTION OF THE ILLUSTRATED EMBODIMENTS

As required, detailed embodiments of the present invention are disclosed herein; however, it is to be understood that the disclosed embodiments are merely exemplary of the invention, which may be embodied in various forms and combinations. Therefore, specific details disclosed herein are not to be interpreted as limiting, but merely as a basis for the claims and as a representative basis for teaching one skilled in the art to variously employ the present invention in virtually any appropriate manner.

Figure 1:
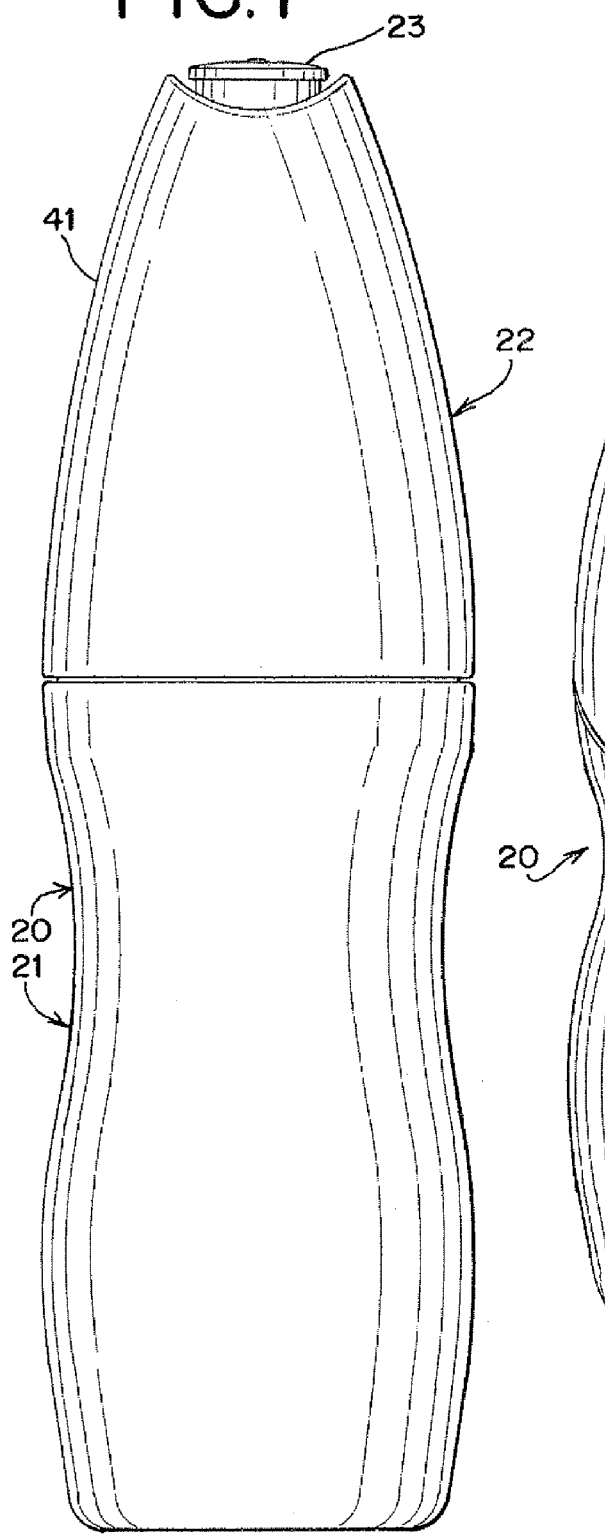
FIG. 1 is an elevational view of an embodiment of a filtering water bottle according to the invention.
Figure 2:
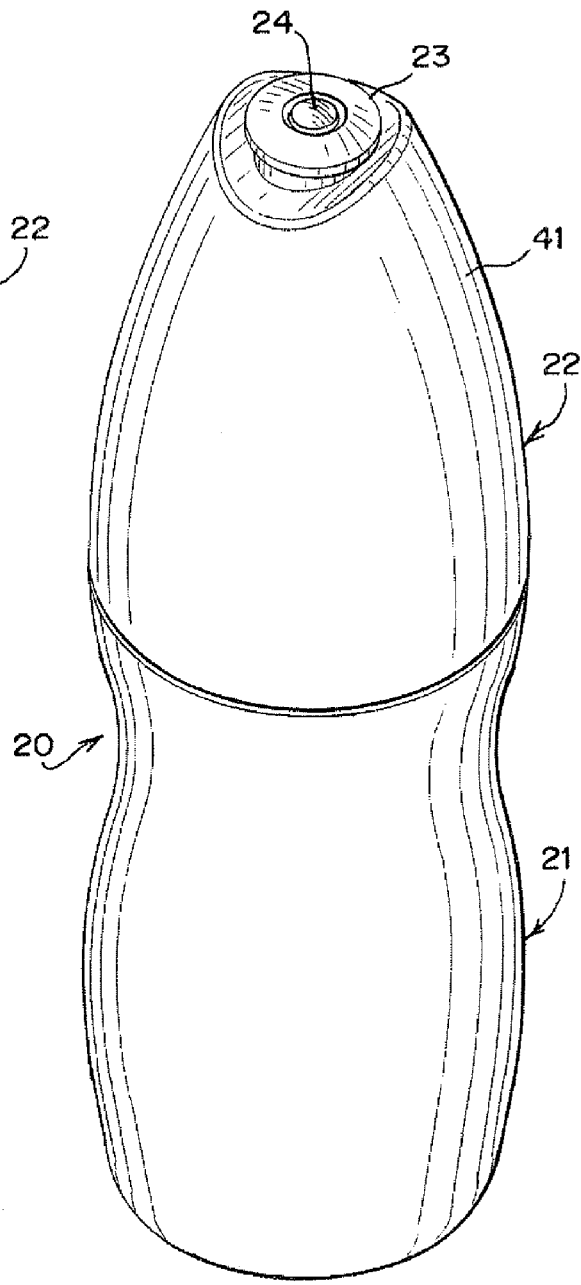
FIG. 2 is a perspective view of the embodiment of FIG. 1.

A filtering water bottle, generally designated as 20, is illustrated in FIG. 1 and FIG. 2. The bottle includes a water-holding container or body component 21 and a bottle cap component 22 with an integral removable filter. The bottle cap component has members that are attachable and removable from complementary members of the container 21 at an open upper end portion of the container component 21, these components combining to provide a sports bottle. The illustrated cap component has an extendable spout 23 with a pull-and-push stopper 24 extending upwardly therefrom.

Figure 3:
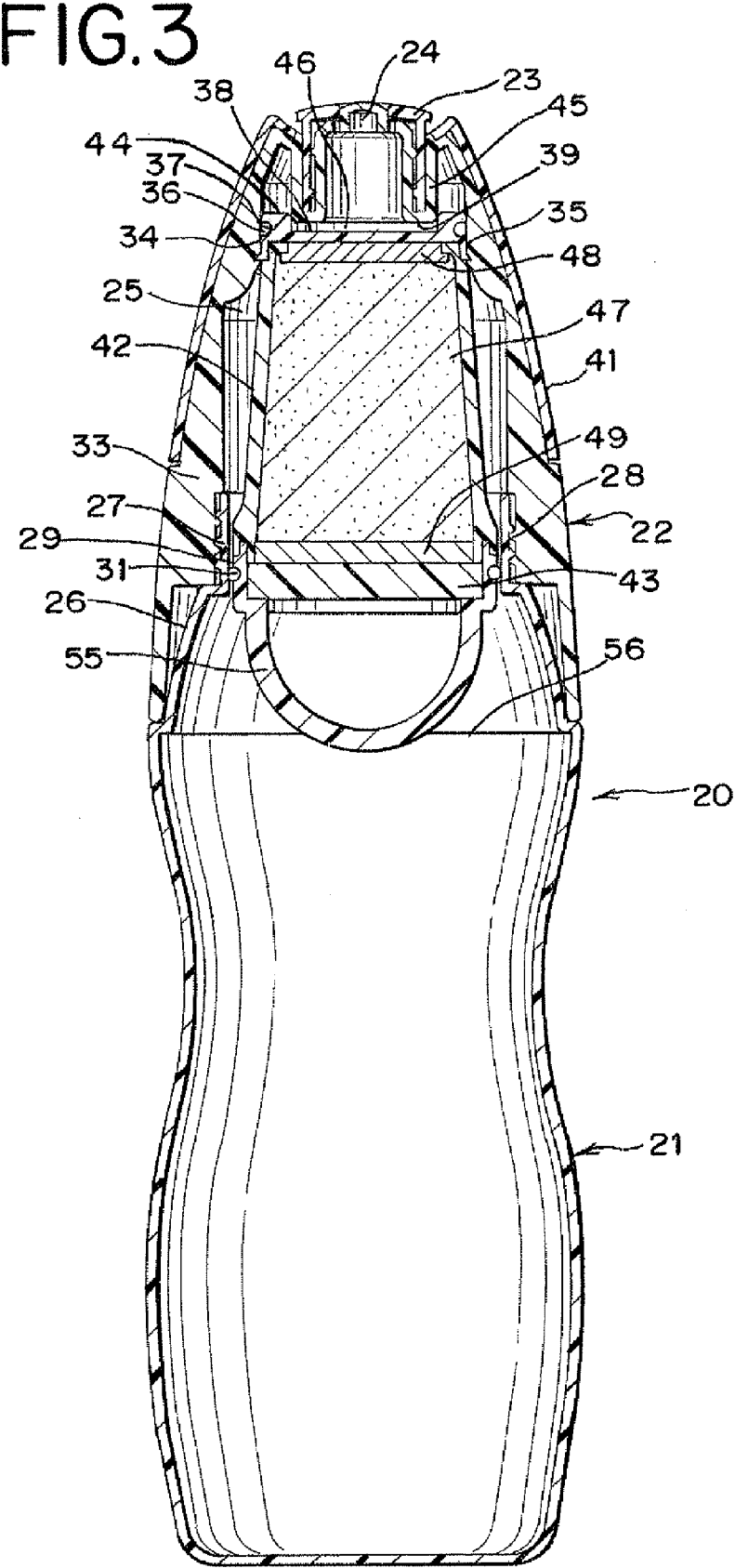
FIG. 3 is a longitudinal cross-sectional view through the axial center of FIG. 1.
Figure 5:
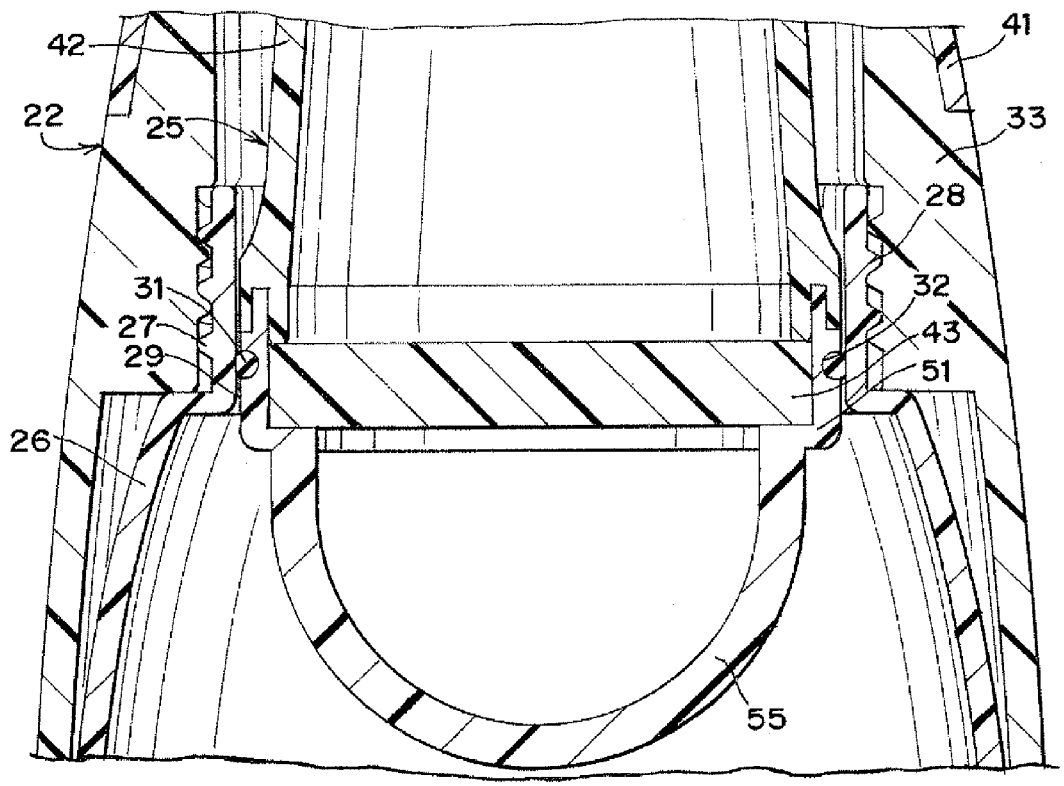
FIG. 5 is a detailed, cross-sectional view of an upper central portion of FIG. 3, with the filter material omitted.
Figure 6:
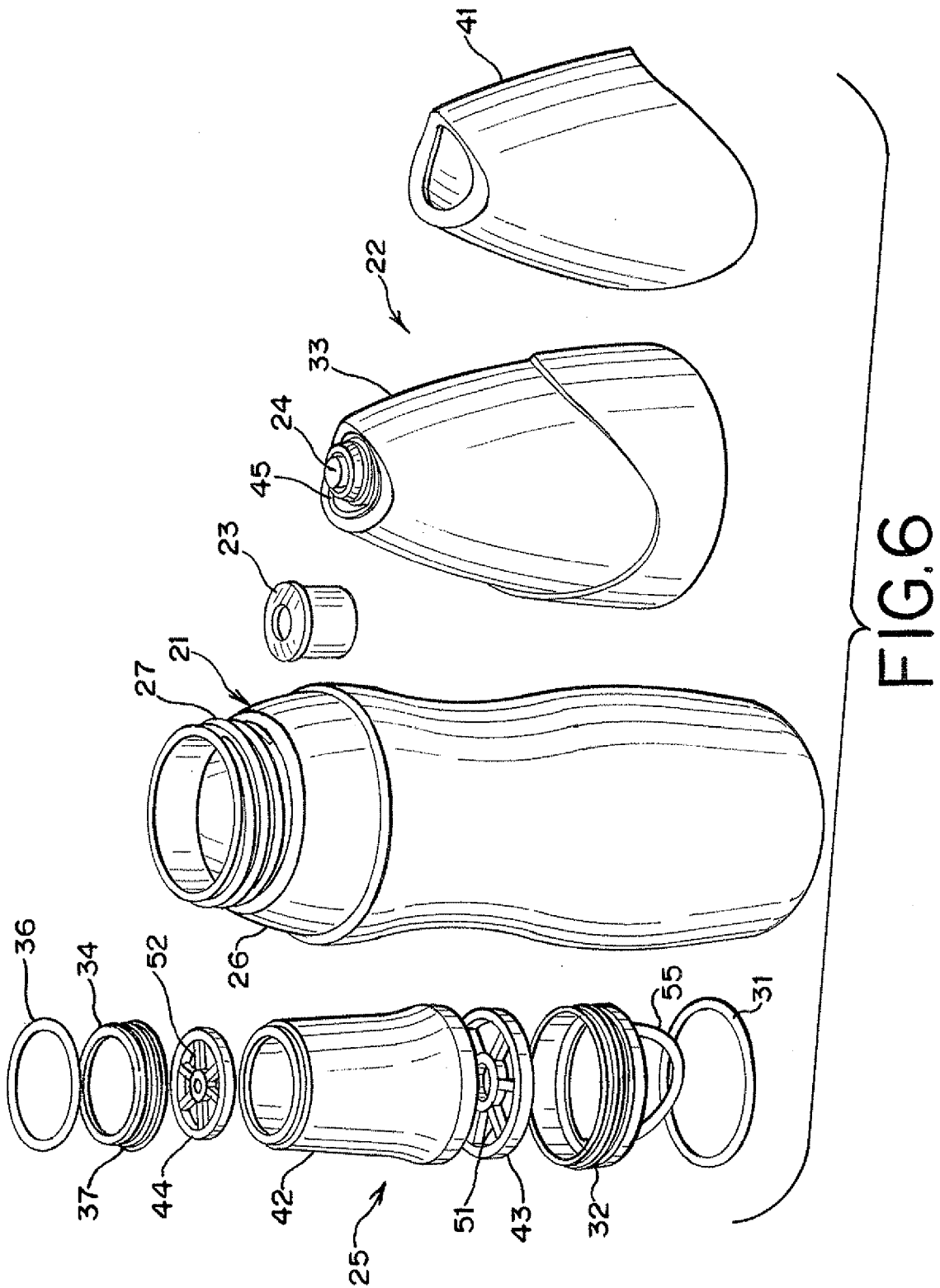
FIG. 6 is an exploded perspective view of the embodiment of FIG. 1.
Figure 7:
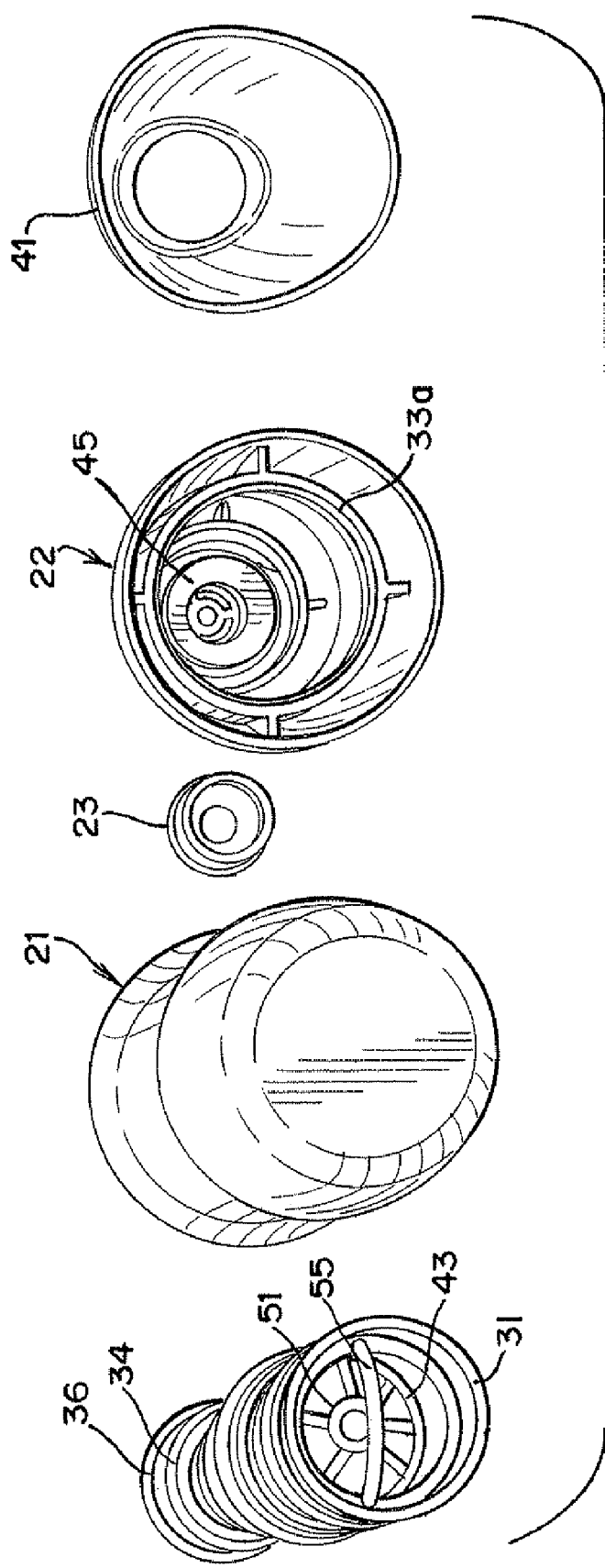
FIG. 7 is a bottom perspective view of the components of FIG. 6.
Figure 11:
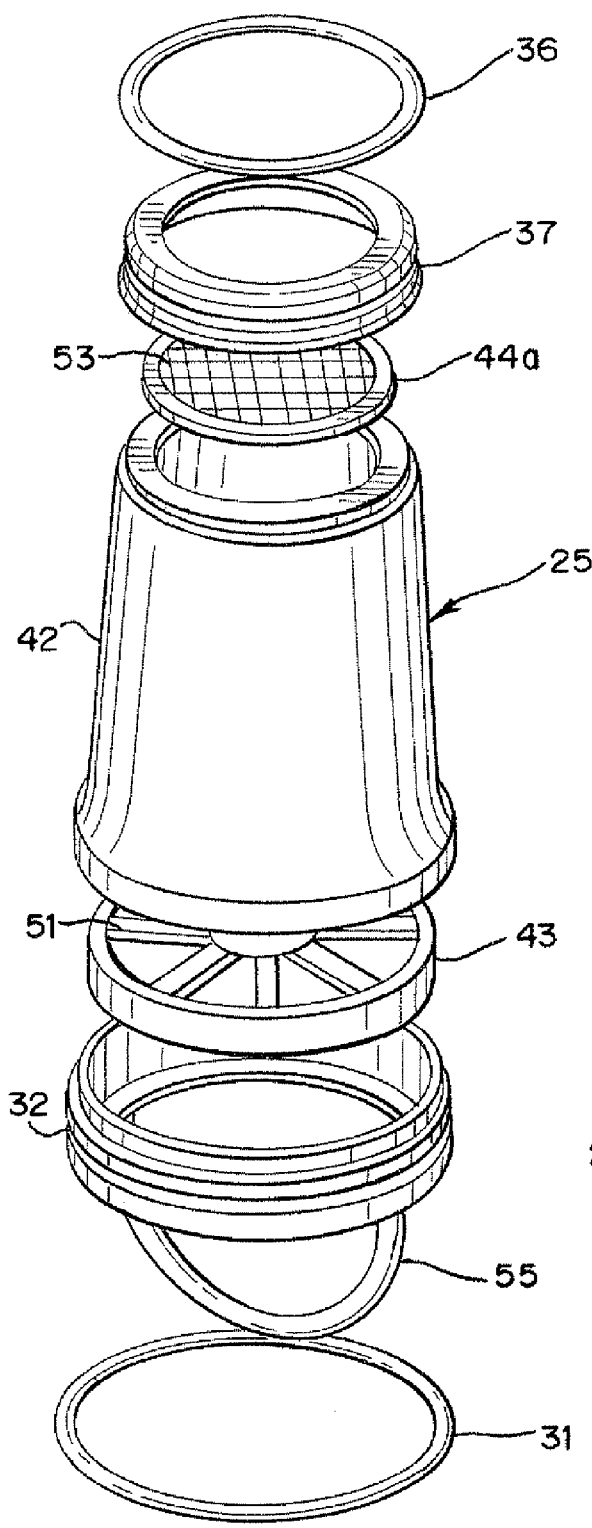
FIG. 11 is an exploded perspective view, taken from a top angle, of the filter assembly of FIG. 9.
Figure 12:
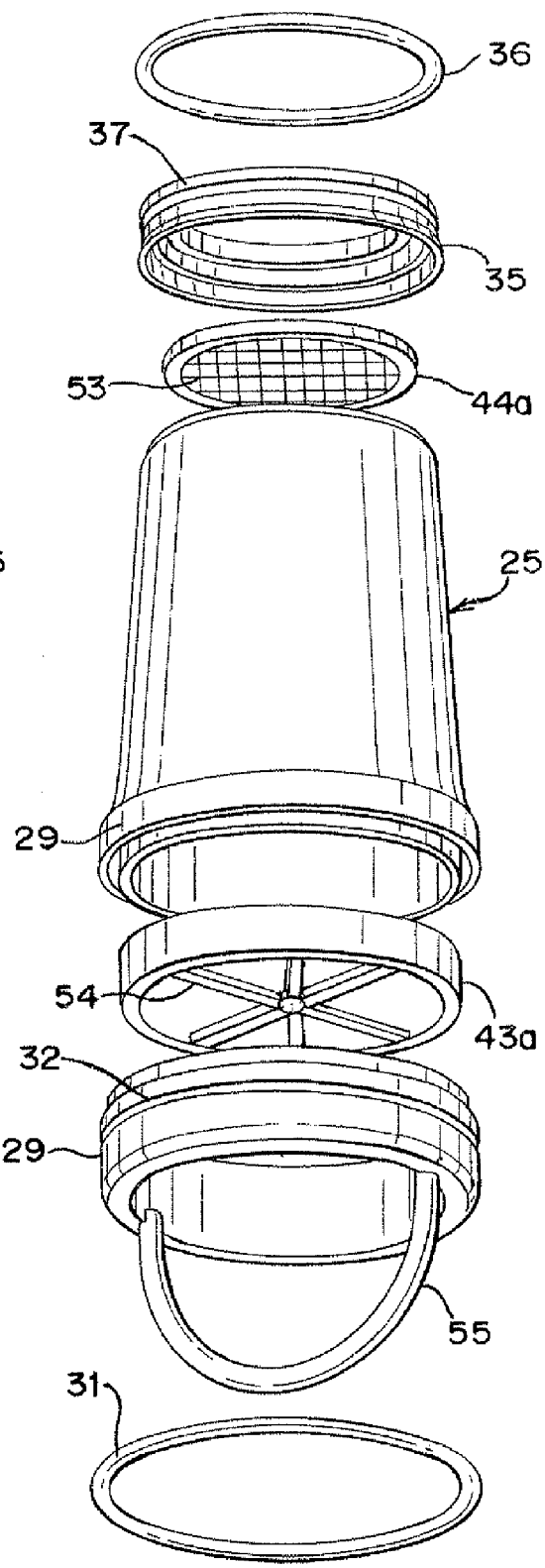
FIG. 12 is an exploded perspective view, taken from a bottom angle of FIG. 9.

With more particular reference to the water holding container or body component 21, reference now is made to FIG. 3. A filter assembly is shown that is generally designated as 25. Filter assembly 25 is removably and replacably mounted within the bottle cap component 22 in a manner discussed in more detail herein. The water-holding container or body component 21 includes an upstanding generally cylindrical wall 26 having one or more meshing interference elements 27 which can take the form of threads shown in FIG. 3 and FIG. 5. These elements 27 engagingly mesh with complementary elements 28 such as the illustrated threads of the illustrated cap component. When the filter-containing cap component 22 is secured to the water-holding body component 21, these intermeshing elements 27, 28 provide a substantially water-tight seal that prevents the water from flowing anywhere other than in a generally axial direction into and through the filter assembly 25.

The substantially water-tight condition of the assembled sports bottle 20 is further secured by providing a water-tight connection between the upstanding generally cylindrical wall 26 of the container body 21 and the lower outside surface of the filter assembly 25. More particularly, a generally cylindrical lower outside wall 29 of the filter assembly 25 has an external diameter that is sized and shaped to be in close engagement with the inside diameter of the upper portion of the upstanding generally cylindrical wall 26. This water-tight characteristic is fostered by including a seal between the cylindrical lower outside wall 29 of the filter assembly and the upstanding generally cylindrical wall of the water-holding container body 21, this being illustrated in the drawings by O-ring 31 positioned within groove 32, such as shown in FIGS. 5, 6, 10, 11 and 12.

Cap component 22 includes a downwardly depending skirt 33, with the meshing interfering element or elements 28 being mounted along a lower inside surface thereof. With this approach, the upstanding generally cylindrical wall 26 of the body component 21 is sealingly sandwiched between the lower outside wall 29 of the filter assembly and the lower inside wall of a downwardly depending skirt 33 of the cap component 22. This arrangement assures a tight fit that will prevent water that is put under pressure when the compliant water-holding container body 21 is squeezed by the hand to impart digital-magnitude pressure to the water and force it upwardly for axial flow through and out of the filter assembly 25 rather than into any cavities of the bottle cap component 22. This function is achieved while providing the filter assembly 25 in a form that is removable from the cap 22 and replaceable therein with a fresh filter assembly 25.

The removable aspect of the filter assembly 25 is achieved in this illustrated embodiment by providing an upper inside wall 34 of the cap component 22 that has a circumference that provides an interference fit with the upper inside generally cylindrical portion of the cap component 22. This interference fit allows the filter assembly 25 to remain correctly positioned within the cap component 22 when it is detached from the body component 21 during filling of the container or body component 21 and also during attachment of the cap component 22 thereonto. This function is accomplished while still allowing digital forces to be sufficient for removal of the filter assembly 25 from the cap component 22. In this particular illustrated embodiment, these functions are facilitated by providing a resilient member such as an O-ring 36. In this embodiment, the O-ring is secured within a groove 37 at the upper inside wall 34, as seen in FIGS. 3, 4, and 6 to 12.

In addition to providing a water-tight and secure seal at these locations, the illustrated embodiment can provide a water-tight seal between an upper end 38 of the filter assembly 25 and a bottom edge 39 of a channel 45 for the spout 23. Water sealability can be achieved without requiring bottom edge 39 to engage upper end disk 38 of the filter assembly 25. Instead, an annular corner 44 of the spout 23 or of a spout mounting channel 45 can closely slidably engage an inside wall 40 of the filter assembly 25. This approach provides some manufacturing tolerance that generally corresponds to the depth of an indent 46 in the top surface of the filter assembly 25.

Figure 4:
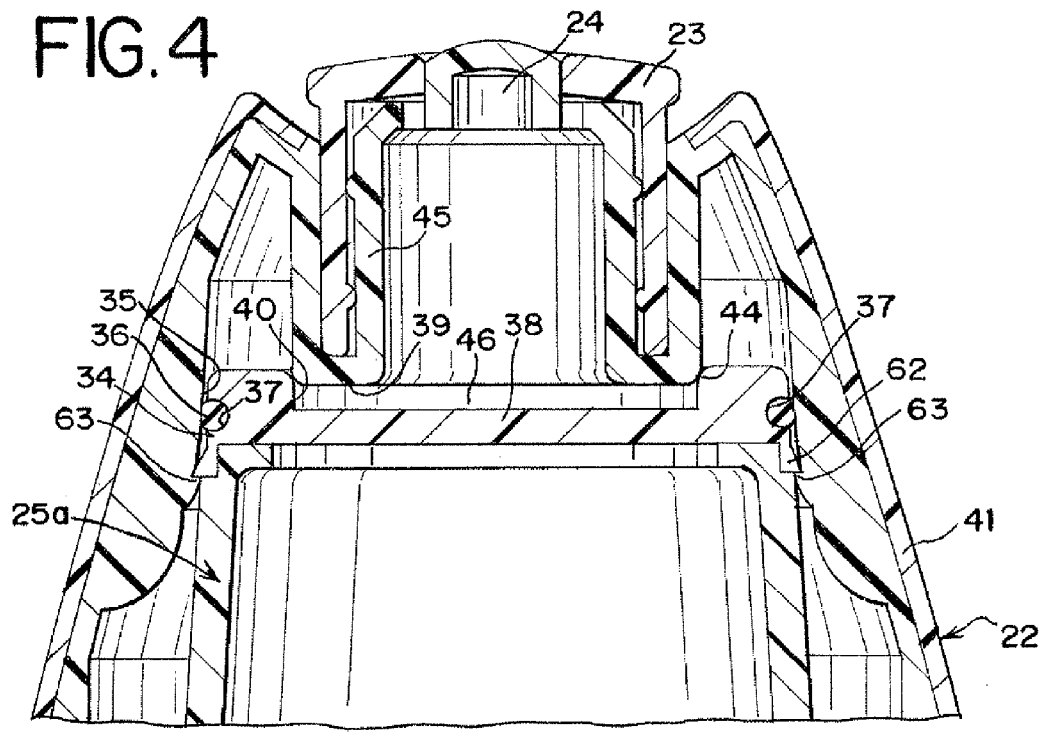
FIG. 4 is a detailed, cross-sectional view of the upper portion of FIG. 3, with the filter material omitted.

FIG. 4 shows another embodiment that is useful in securing the filter assembly 25a thereof in place. Engaging interfering projections deform to allow passage of the filter assembly 25a in an insertion direction (upwardly as shown in FIG. 4) and return to interference condition thereby "locking" the filter assembly 25a in place. In the illustrated embodiment, filer assembly 25a has a full annular or interrupted annular radial outwardly directed projection 62. This can be rigid, semi-rigid or resilient. A full annular or interrupted annular inwardly directed projection 63 is positioned, sized and shaped to permit passage of the outwardly directed projection 62 therebeyond and then to lock the filter assembly 25a in place by interference between the projections 62 and 63. The inwardly directed projection or projections 63 can be rigid, semi-rigid or resilient, depending in part on the resiliency of the inwardly directed projection or projections 62. Typically, both will be resilient, but any combination can be practiced provided relatively easy passage and secure locking are achieved.

In a typical arrangement using threads at the locations of elements 27 and 28, the user typically will rotate the upper cap component onto the water-holding container or body component 21 much in the way that many caps are secured onto many bottles or jars, with removal being in the opposite direction of rotation. Placement of the cap component 22 onto the body component 21 and removal thereof can be aided by having an outside surface having an enhanced or higher coefficient of friction than other outside surfaces of the filtering water bottle 20. In this regard, a grip-enhancing overlay 41 is shown at the upper outside surface of the bottle cap component 22. Such an overlay can be made of a polymer having a higher coefficient of friction than the polymer or polymers of the remainder of the bottle. Such materials can have a hardness value lower than, and/or have a surface roughness that is discernibly less smooth than, that of the rest of the container, especially the cap component.

FIG. 3 and FIGS. 9-12 provide further details concerning the filter assembly 25 that is illustrated in this embodiment. A hollow body or shell 42 is defined by an elongated sidewall and by the generally cylindrical lower outside wall 29 and the upper inside wall 34. This generally cylindrical wall runs from approximately the upper end disk 38 and a lower end disk 43 in order to provide a generally enclosed volume.

The filter assembly 25 includes filtering material. It has been found that a multiple-component filter system provides the advantages of filtering for particulates and for absorbing unwanted material or undesirable contaminants. A typical multi-component filtering system is as follows.

An example of a filter assembly includes a primary filter 47 that comprises granular carbon infused with a silver additive. This can be especially useful to absorb odors and colors, some organic chemicals, chlorine-containing chemicals, and the like. This is secured in place and sandwiched between a secondary upper filter 48 and a secondary lower filter 49. Typically each of these secondary filters is in the form of a disk having enough integrity to maintain its overall shape during use. Secondary filters can be made of cellulosic materials, porous polymers, polymer foams, and the like. Examples include nylon-reinforced papers and polyurethane foams. Each secondary filter can be made of the same material or of different materials. For example, both secondary filters could be a nylon-reinforced paper disk, both could be a polyurethane foam, or one of the secondary filters could be nylon-reinforced paper and the other a polyurethane foam. The lower retainer of one embodiment secures a polyurethane foam filter, and the upper retainer secures a nylon-reinforced cellulosic filter.

In order to ensure that the filter material or filter system remains in place within the hollow body or shell 42, a grill or retainer typically will be provided at each end, namely by the lower end disk 43 and by the annular cover 44 at the upper end. In order for water to flow through the filter assembly, each such retainer has openings therethrough. Examples in this regard are found in FIG. 6, with the openings taking the form of a grill-work retainer 51 having a central open area and spokes emanating therefrom. A similar grill-work retainer 52 provides flow-through capabilities or porosity for the annular cover 44. Other flow-through structures can be provided, such as a mesh grill 53 of the annular cover 44a of FIG. 11 and FIG. 12 and the wheel-spoke grill 54 of the lower end disk 43a of FIG. 12.

The lower retainer or end wall disk 43, 43a has a grasping member protruding therefrom. In the illustrated embodiment, this takes the form of a curved handle 55, that can be generally arcuate, allowing for easy gripping of the filter assembly 25. Pulling on the gripping member 55 provides for digital, hand grasping of the filter assembly while in place within the cap component 22 separated from the body component 21 in order to grasp a spent filter assembly to remove same from the cap component 22. The grasping member 55 also provides a convenient handle for directing the filter assembly 25 during replacement of the filter assembly 25. When desired, the grasping member 55 also can engage an internal ledge, such as a ledge 56, of the water-holding body component 21 to help maintain the filter assembly 25 in place, as noted below.

FIG. 8 illustrates an alternative embodiment showing a longitudinal cross-section through the longitudinal axis of the upper portion of this particular embodiment. The filter or filter system is omitted in this view, but it will be understood that these filter structures will be within the hollow body or shell 42a. As previously noted, in this embodiment, the curved handle 55 can engage a ledge within the upper portion of the water-holding container or body 21. It will be appreciated that the ledge can be placed at the location of a ledge 57 by proceeding with suitable sizing and positioning. It will be appreciated that ledge 57 will engage the handle 55 at the approximate midpoint of the handle as those components are shown in FIG. 8.

FIG. 8 shows a few features different from those of embodiments in other drawings. For example, the indent 46a in the upper end disk 38a of the filter assembly 25a is shallower than that shown in other drawings, such as FIG. 3, and the bottom edge 39 of the spout mounting channel 45 and the surface of the end disk 38a directly engage each other. In addition, the downwardly depending skirt 33a of the cap component 22a is spaced from an internal wall 64 of the cap component 22a. This saves on material without sacrificing water tightness.

In addition, FIG. 8 depicts a water-holding container body 21a that has an upstanding generally cylindrical wall 26a which is configured to directly engage the filter assembly 25a when the cap component is fully inserted onto the body component of 21a. More particularly, the illustrated upstanding generally cylindrical wall 26a includes an inwardly directed rim 58 that defines a shelf surface 59 onto which an outside annular extent 61 of lower end disk 43 rests when assembly is completed.

It will be understood that the embodiments of the present invention which have been described are illustrative of some of the applications of the principles of the present invention. Numerous modifications may be made by those skilled in the art without departing from the true spirit and scope of the invention. Various features which are described herein can be used in any combination and are not limited to procure combinations that are specifically outlined herein.

The invention claimed is:

1. A reusable portable bottle having filtering capability, comprising:

a hollow container component, said container component including a relatively rigid neck portion surrounding an open mouth portion and positioned above a flexible body portion that is squeezable to reduce total volume of the body portion;

a cap component having a spout, said hollow container component and said cap component include respective interengaging members so as to secure said cap component to said hollow container component;

said hollow container component and said cap component each have an external surface and an internal surface, each internal surface being substantially cylindrical and substantially coaxial with the hollow container component and with the cap component;

a filter assembly;

said filter assembly is removably and replacably slidably secured to said interior surface of the hollow container component and of the cap component so as to be inside said neck while remaining outside said flexible body portion of the hollow container component when said cap component is secured to said hollow container component;

said filter assembly includes a hollow shell having an open central chamber having two generally opposing open ends;

said filter assembly includes a primary filter located inside said open central chamber;

a first of said open ends being adjacent said spout and being closed by a secondary filter, said secondary filter being secured to said first open end by a first retainer, a second one of said open ends being closed by a further secondary filter, said further secondary filter being secured to said second open end by a second retainer;

said filter assembly has an axial flow characteristic whereby water present in said flexible body portion of the container component moves, in response to digital squeezing pressure on the external surface of the hollow container component, through said secondary filter, then through said primary filter and then through said further secondary filter, and the water then exits the bottle through said spout;

the first retainer of the filter assembly has an outer circumference, a groove in its outer circumference, and an O-ring situated in the groove, and said O-ring engages said internal surface of the cap component whereby pushing movement and pulling movement respectively slidably secure and remove the filter assembly onto or from the internal surface of the cap component; and the second retainer of the filter assembly has an outer circumference, a groove in its outer circumference, and an O-ring situated in the groove, and said O-ring engages said internal surface of the hollow container component, whereby pushing movement and pulling movement respectively slidably secure and remove the filter assembly onto or from the internal surface of the hollow container.

2. The reusable portable bottle of claim 1, wherein the second retainer assembly has a handle depending therefrom in the direction of the flexible body portion.

3. The reusable portable bottle of claim 1, wherein at least one of the secondary filters comprises a paper fabric.

4. The reusable portable bottle of claim 1, wherein at least one of the secondary filters comprises a polymer foam.

5. The reusable portable bottle of claim 1, wherein said primary filter comprises activated carbon.

6. The reusable portable bottle of claim 1, wherein the first retainer assembly sealingly engages a portion of an assembly supporting said spout.

7. The reusable portable bottle of claim 1, wherein each of said filter assembly and the internal surface of said cap component has in interference member, and said interference members engage each other for securing the filter assembly within the cap component.

8. The reusable portable bottle of claim 1, wherein said neck portion of the hollow container component includes an upstanding generally cylindrical wall having an inwardly directed rim that defines a shelf surface onto which said filter assembly rests.

9. A reusable portable bottle having filtering capability, comprising:
a hollow container component, said container component including a relatively rigid neck portion surrounding an open mouth portion and positioned above a flexible body portion that is squeezable to reduce total volume of the body portion;
a cap component having a spout, said hollow container component and said cap component include respective interengaging members so as to secure said cap component to said hollow container component;
said hollow container component and said cap component each have an external surface and an internal surface, each internal surface being substantially cylindrical and substantially coaxial with the hollow container component and with the cap component;

a filter assembly;
said filter assembly is removably and replacably slidably secured to said interior surface of the hollow container component and of the cap component so as to be inside said neck while remaining outside said flexible body portion of the hollow container component when said cap component is secured to said hollow container component;
said filter assembly includes a hollow shell having an open central chamber having two generally opposing open ends;
said filter assembly including a primary filter located inside said open central chamber, said primary filter including activated carbon with silver;
a first of said open ends being adjacent said spout and being closed by a secondary filter, said secondary filter being secured to said first open end by a first retainer, a second one of said open ends being closed by a further secondary filter, said further secondary filter being secured to said second open end by a second retainer, said secondary filters being selected from the group consisting of nylon-reinforced paper and polyurethane foam;
said filter assembly has an axial flow characteristic whereby water present in said flexible body portion of the container component moves, in response to digital squeezing pressure on the external surface of the hollow container component, through said secondary filter, then through said primary filter and then through said further secondary filter, and the water exits the bottle through said spout;
the first retainer of the filter assembly has an outer circumference, a groove in its outer circumference, and an O-ring situated in the groove, and said O-ring engages said internal surface of the cap component whereby pushing movement and pulling movement respectively slidably secure and remove the filter assembly onto or from the internal surface of the cap component; and
the second retainer of the filter assembly has an outer circumference, a groove in its outer circumference, and an O-ring situated in the groove, and said O-ring engages said internal surface of the hollow container component, whereby pushing movement and pulling movement respectively slidably secure and remove the filter assembly onto or from the internal surface of the hollow container.

10. The reusable portable bottle of claim 9, wherein the second retainer assembly has a handle depending therefrom in the direction of the flexible body portion.

11. The reusable portable bottle of claim 9, wherein the first retainer assembly sealingly engages a portion of an assembly supporting said spout.

12. The reusable portable bottle of claim 9, wherein each of said filter assembly and the internal surface of said cap component has in interference member, and said interference members engage each other for securing the filter assembly within the cap component.

13. The reusable portable bottle of claim 9, wherein said neck portion of the hollow container component includes an upstanding generally cylindrical wall having an inwardly directed rim that defines a shelf surface onto which said filter assembly rests.

14. A reusable portable bottle having filtering capability, comprising:
a hollow container component, said container component including a relatively rigid neck portion surrounding an open mouth portion and positioned above a flexible body portion that is squeezable to reduce total volume of the body portion;

a cap component having a spout, said hollow container component and said cap component include respective interengaging members so as to secure said cap component to said hollow container component;

said hollow container component and said cap component each have an external surface and an internal surface, each internal surface being substantially cylindrical and substantially coaxial with the hollow container component and with the cap component;

a filter assembly;

said filter assembly is removably and releasably slidably secured to said interior surface of the hollow container component and of the cap component so as to be inside said neck while remaining outside said flexible body portion of the hollow container component when said cap component is secured to said hollow container component;

said filter assembly includes a hollow shell having an open central chamber having two generally opposing open ends, said hollow shell having filter material within said open central chamber, said filter material being retained within said open central chamber by a first and a second retainer;

said second retainer sealingly engages a portion of said neck portion of the container component to prevent passage of water therethrough;

said filter assembly has an axial flow characteristic whereby water present in said flexible body portion of the container component moves, in response to digital squeezing pressure on the external surface of the flexible body portion of the hollow container component, along a water flow path through said filter material, and then through said spout;

said filter assembly has an outer circumference, a first groove in its outer circumference, and an O-ring situated in the first groove, and said O-ring engages said internal surface of the cap component, whereby pushing movement and pulling movement respectively slidably secure and remove the filter assembly onto or from the internal surface of the cap component; and said filter assembly outer circumference has a second groove and a second O-ring is situated in the second groove, and said O-ring engages said internal surface of the hollow container component, whereby pushing movement and pulling movement respectively slidably secure and remove the filter assembly onto or from the internal surface of the hollow container.

15. The reusable portable bottle of claim 14, wherein said neck portion of the hollow container component includes an upstanding generally cylindrical wall having an inwardly directed rim that defines a shelf surface onto which said filter assembly rests.

16. The reusable portable bottle of claim 14, wherein the first retainer sealingly engages a portion of an assembly supporting said spout.

17. The reusable portable bottle of claim 14, wherein each of said filter assembly and the internal surface of said cap component has in interference member, and said interference members engage each other for securing the filter assembly within the cap component.

18. A filter assembly for a reusable portable bottle, comprising:

a filter assembly being adapted to be removably and replacably slidably secured to an interior surface of both a cap portion and a hollow container portion of a reusable portable bottle;

said filter assembly including a cylindrical body having an open central chamber having two open ends, a first of said open ends being closed by a first filter, said first filter being secured to said first open end by a first retainer, a second of two open ends being closed by a second filter, said second filter being secured to said second open end by a second retainer;

said filter assembly including a third filter located inside said open central chamber;

a curved handle depends from said second retainer in a direction away from said filter assembly;

the first retainer has an outer circumference, a groove in its outer circumference, and an O-ring situated in the groove, the O-ring extending radially beyond the filter assembly adequate to engage the bottle cap portion to effect the removable and replaceable slidable securement to the cap portion interior surface; and the second retainer has an outer circumference, a groove in its outer circumference, and an O-ring situated in the groove, this O-ring extending radially beyond the filter assembly adequate to engage the hollow container portion to effect the removable and replacable slidable securement to the hollow container interior surface.

19. The filter assembly of claim 18, wherein the first and second filters are selected from the group consisting of a paper fabric and a polymer foam.

20. The filter assembly of claim 18, wherein the third filter comprises activated carbon.

\* \* \* \* \*